Figure 1:
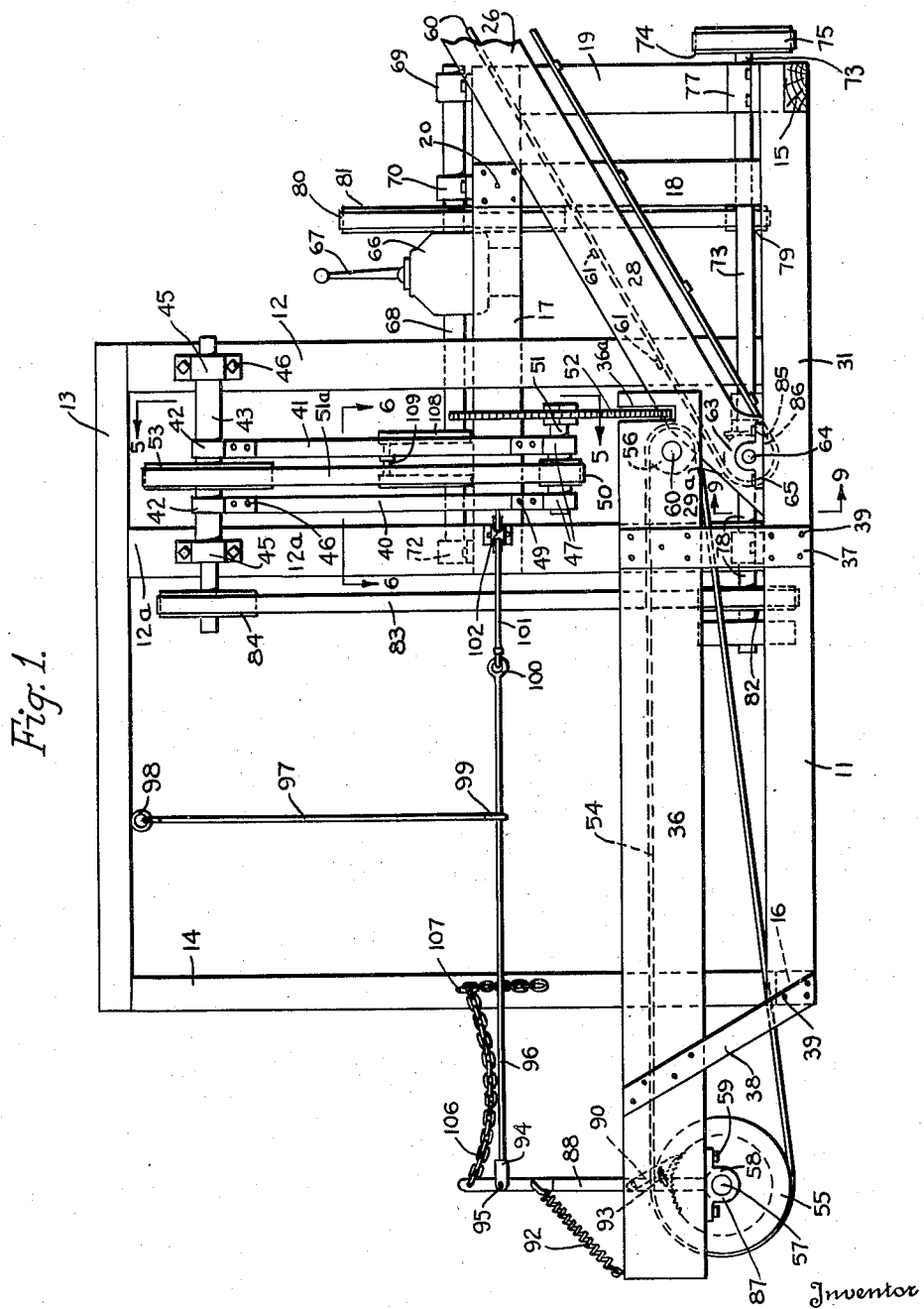

Feb. 14, 1950  G. W. CASHWELL  2,497,488
AUTOMATIC INTERMITTENT FEED-AND-CUT
SWING FRAME WOOD SAW

Filed May 20, 1946  4 Sheets-Sheet 3

Inventor
G. W. CASHWELL

By Kimmel & Crowell
Attorneys

Feb. 14, 1950 — G. W. CASHWELL — 2,497,488
AUTOMATIC INTERMITTENT FEED-AND-CUT SWING FRAME WOOD SAW
Filed May 20, 1946 — 4 Sheets-Sheet 4
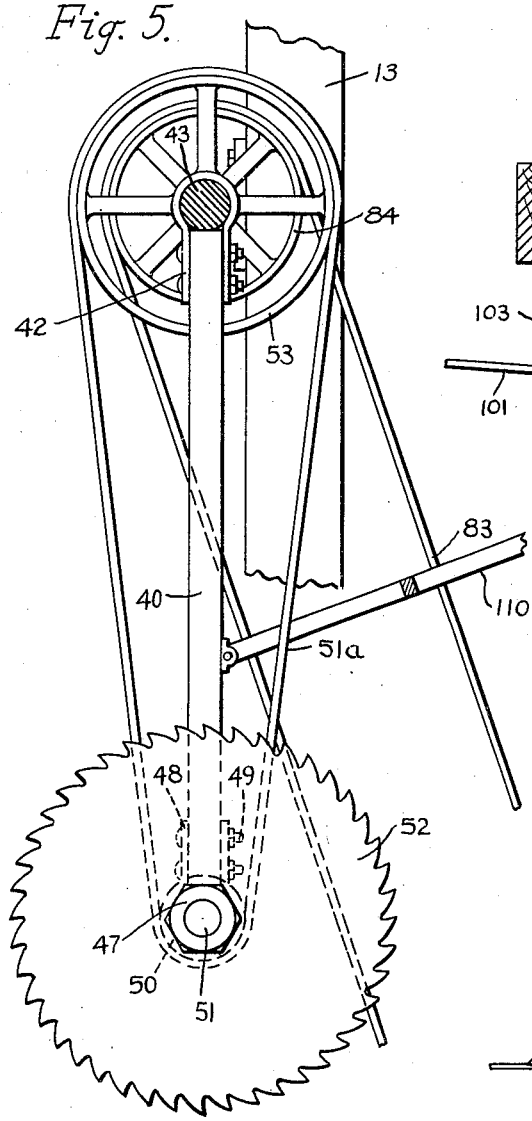
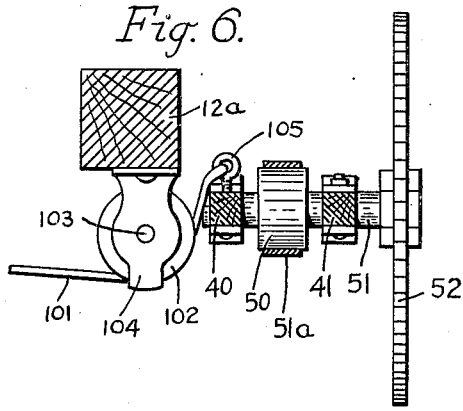
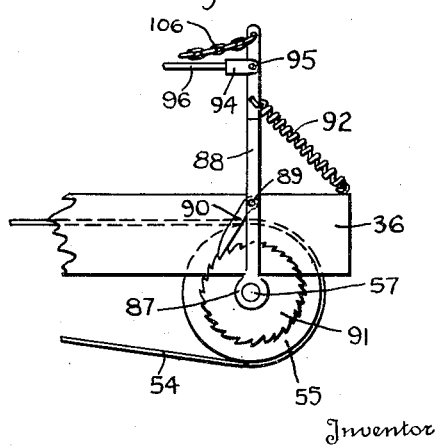
Inventor
G. W. CASHWELL
By Kimmel & Crowell
Attorneys Patented Feb. 14, 1950

2,497,488

UNITED STATES PATENT OFFICE 2,497,488

AUTOMATIC INTERMITTENT FEED-AND-CUT SWING FRAME WOOD SAW

George Washington Cashwell, Elizabethtown, N. C.

Application May 20, 1946, Serial No. 671,072

4 Claims. (Cl. 143—46)

The present invention relates to improvements in wood cutting mechanism and more particularly to automatic means for delivering logs to be sawed into sections and to be conveyed away from the saw.

One of the objects thereof is to provide a compact, sturdily constructed framework for imparting a positive motion to a saw carrier to cause a rotary saw to make a cutting traverse across the end of a log feeding trough.

Another object thereof is to provide a simple, efficient and inexpensive timber cutting mechanism characterized by steady operation of the log cutting rotary saw for continuously severing the log into sections in an automatic manner.

Another object thereof is to provide timber sawing mechanism which will act in time with log feeding mechanism and cut-log conveying-away mechanism.

A still further object thereof is to provide a power plant with effectively located transmission connections for driving not only the rotary saw and its motion-imparting carrier, but also the log feeding mechanism.

Another object thereof is to provide, in a device as described, improved means for synchronizing the operation of the log feeding device with respect to the times of operation of the log cutting mechanism.

A further object thereof is to provide, in a device of the kind described, improved means operating all the instrumentalities necessary for effecting automatic control of the timber cutting in such a manner that any of them may be easily accessible for replacements and repairs.

With the above and other objects in view, my invention consists in the combination, arrangement and details of construction disclosed in the drawings and specification, and then more particularly pointed out in the appended claims.

Figure 2:
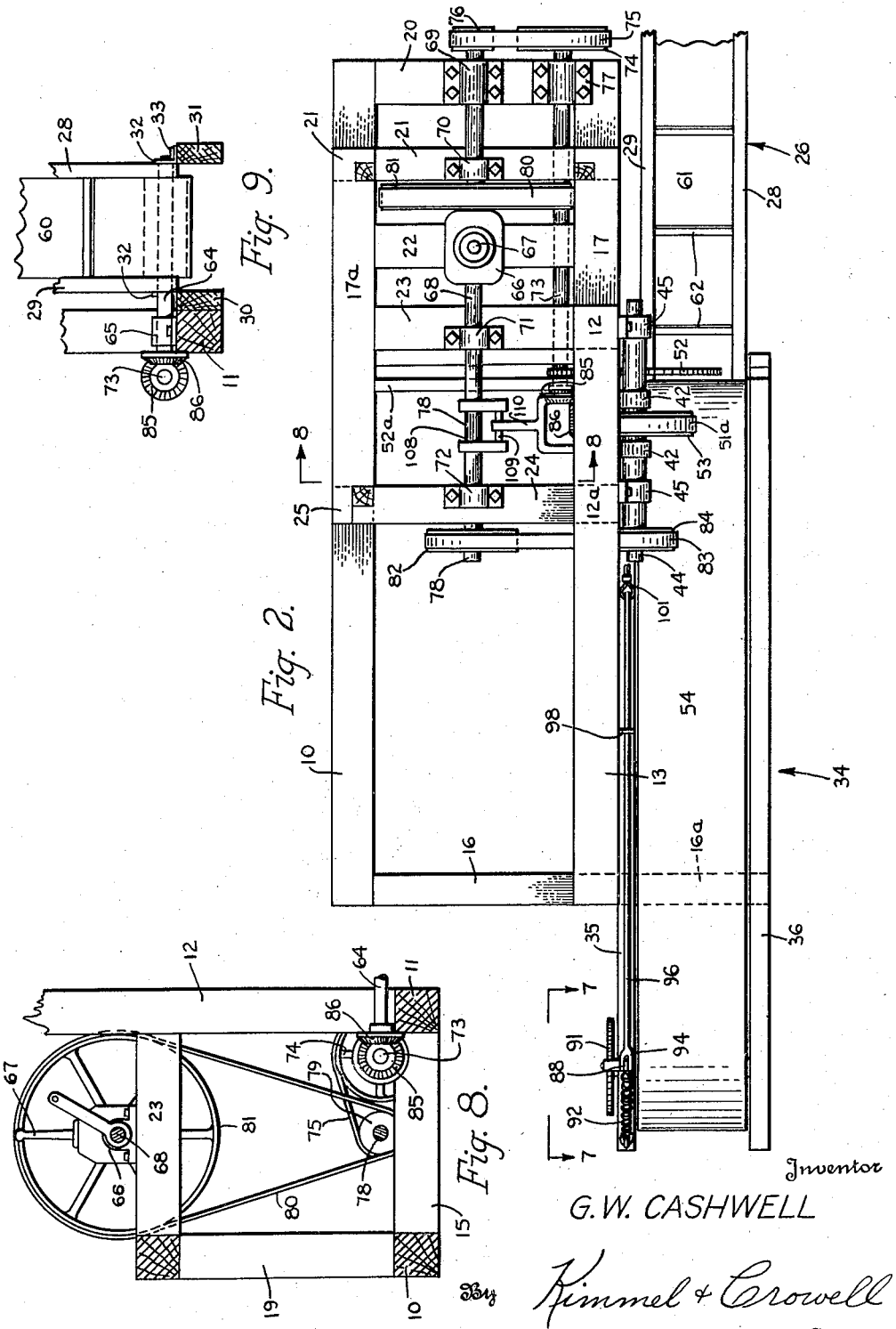
Figure 3:
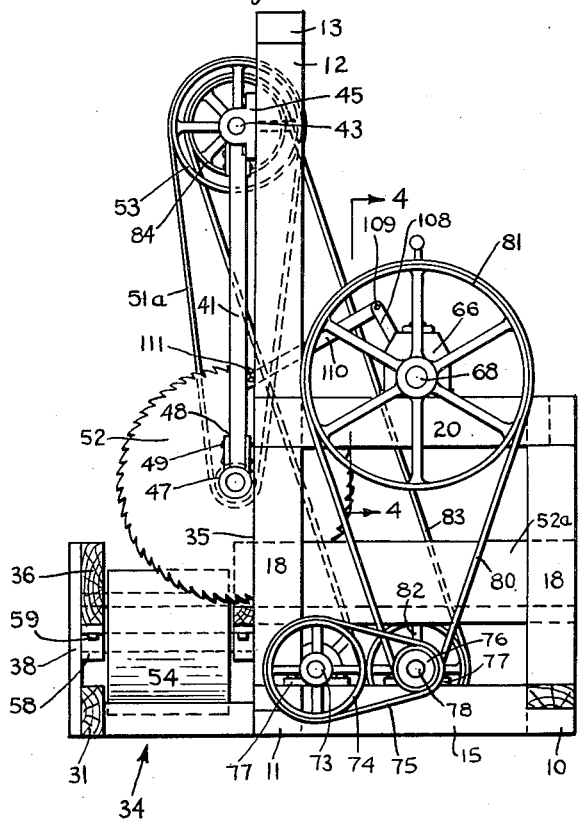
Figure 4:
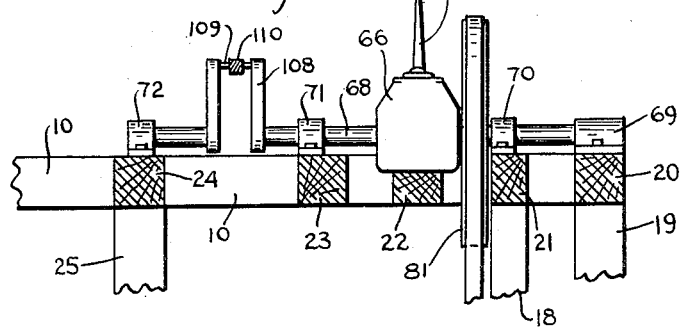

In the drawings, wherein similar reference characters designate similar parts throughout the respective views, Figure 1 is a side elevation of my invention, Figure 2 is a top plan view thereof, Figure 3 is an end elevation thereof, Figure 4 is a cross section thereof, showing fragmentarily, the motor and motor shaft, on line 4—4 of Figure 3.

Figure 5 is an elevation of a saw drive connection taken on line 5—5 of Figure 1, looking in the direction of the arrows, Figure 6 is a detail view, partly in section of a cable operated intermittent feed, taken on line 6—6 of Figure 1, looking in the direction of the arrows, Figure 7 is a fragmental detail view, in side elevation, taken on line 7—7 of Figure 2, looking in the direction of the arrows, Figure 8 is a cross-section taken on line 8—8 of Figure 2, looking in the direction of the arrows, and Figure 9 is a cross-section taken fragmentarily on line 9—9 of Figure 1, looking in the direction of the arrows.

In the drawings, which are merely illustrative of my invention, the various parts of my invention are detailed.

Broadly considered, the present invention consists of suitable strong, sturdy vibration eliminating framework, a reciprocating motion transmitter to a rotary saw, means for feeding logs to be cut by the saw, means for conveying-away cut logs cut by the saw, and an intermittent feed for operating the log feeding means.

The framework of the machine consists of the two floor engaging longitudinal sills 10 and 11, a scaffold disposed between the ends of the framework and a bench mounted at one end of the framework and connected to the scaffold. To this framework a pair of uprights 12 and 12a are secured at their lower ends to the sill 11 from a scaffold which uprights are connected at their upper ends by a horizontal beam 13 secured not only to the uprights 12, 12a but also at one end to an upright 14 secured also at its lower end to the still 11. End crossbars engage the floor and are connected to the sills 10 and 11, being designated respectively 15 and 16.

The bench consists of short uprights 18 and 19 secured to crossbar 15 at their lower ends, and connected in spaced relation at their upper ends by a connecting bar 20. In Figures 2 and 4 are seen four crossbars 21, 22, 23, and 24, connected at opposing ends to the longitudinally extending bars 17, 17a. Bar 17 is connected at one end to bar 18 and at its outer end to upright 12a. Bar 17a is connected at one end to bar 21 and at its opposite end to a short upright 25.

A cut-log conveying-away trough is broadly designated 26. It has the oppositely arranged diagonally disposed belt confining side walls 28 and 29, and at its lowermost receiving end, by means of brackets or bearings 32, it carries a pair of oppositely arranged side strips 30, 31 (Fig. 9), fasteners 33 attaching these strips to the side walls 28, 29.

The log feeding conveyor is broadly designated 34. It has the belt confining horizontally extending side walls 35, 36 making a trough. A vertical plate 37, by means of fasteners 39, attaches the discharge forward end of this trough to the sill 10 of the frame. The opposite end of the trough is supported in horizontal position upon the frame by means of diagonal gussets 38, secured by fasteners 39 to the frame. It will be seen that the trough 34 extends on one side of the frame up to one end thereof, and that the trough 26, which is diagonally disposed, extends in line therewith up to the other end or beyond the other end of the frame. The lower receiving end of the trough 26 projects directly under the adjacent discharge end of the trough 34.

The saw supporting and motion-imparting means or swing frame consists of oppositely arranged lever arms 40, 41 carrying, rigidly at their upper ends hangers 42 which are operatively mounted upon a shaft 43, this shaft being journaled in bearings 45 secured by fasteners 46 to the uprights 12, 12a. At their lower ends the lever arms 40, 41 carry collars 47 having arms 48 rigidly secured by fasteners 49 to the lever arms. On a shaft 51 whose ends are journaled in the collars 47 is made fast a pulley 50 over which is trained a belt 51a, which is also trained upon an overhead pulley 53 made fast upon shaft 43. The rotary saw 52 is also made fast upon one end of the shaft 51, and it extends laterally of lever arm 41. This rotary saw 52 is so located in position that it may move transversely of the frame in the scaffold to occupying a log sawing position in front of the discharge end of trough 34 directly over the receiving end of trough 26.

The log conveying means includes an endless belt 54 trained over a pulley 55 at one end, and upon another pulley 56, of smaller size than pulley 55. Pulley 55 is on a shaft 57 mounted in bearings 58 operatively secured to the framework, by fasteners 59. The other pulley 56 is made fast upon a shaft 60, having its end journaled in the side walls 35, 36 of the trough 34.

The cut-log conveying means consists of a belt 61 trained upon a pulley 63, made fast on a shaft 64 journaled in suitable bearings 65 and 32, the bearing 65 being secured directly upon sill 11. The conveyor belt 60 carries a series of spaced apart cleats or clips 61 for carrying cut logs upwardly to a point of delivery, not shown.

The transmission 66 is mounted on the bench, upon cross bar 22 thereof. It has the speed control manual lever 67. It also has a transmission shaft 68 which in Figure 2 is seen to extend some distance through the scaffold part of the framework. The shaft 68 is journaled in the respective bearings 69, 70, 71 and 72 secured upon the respective crossbars 20, 21, 23 and 24 of the framework.

A countershaft 73 is journaled in or upon the end cross beam 15 of the framework. It has made fast thereon a pulley 74 over which is trained a belt 75, which is also trained over another pulley 76. This shaft 73 is mounted in bearings 77. This pulley 76 is made fast upon a motor drive shaft 78 (Figs. 1 and 8), on which is made fast a pulley 79 over which is trained vertically a belt 80 which is also trained upon a larger size pulley 81 made fast upon the transmission shaft 68 (Fig. 3). Motor drive shaft 78 also has made fast thereupon at its inner end a pulley 82 located opposite upright 12a. Trained over pulley 82 is a vertical belt 83 which is also trained over pulley 84 which is made fast upon shaft 43 in the upper end of the scaffold.

A miter gear 85 is made fast on shaft 64 which carries the pulley for driving belt 60 of the cut log carrying away trough 26. This miter gear meshes with a miter gear 86 made fast upon countershaft 73.

An intermittent feed is provided for the belt 54 of the log feeding trough 34, reference being made to Figs. 1, 2, and 7, it is seen that shaft 57, which carries pulley 55 for driving belt 54, has movably mounted thereon the collar end 87 of the lever 88, which is pivoted for swivelable movement upon a shaft 57. A pawl 90 engages the teeth of a ratchet wheel 91, being also mounted upon pivot pin 89 on lever 88, while ratchet wheel is made fast upon shaft 57. An expansion coiled spring 92 has one end attached to side wall 36 of trough 34, and its free end attached to lever 88 to hold the lever normally in vertical position shown in Figure 7. In Figure 1 is shown a short length of coiled spring 93 attaching yieldingly pawl 90 to lever 88.

The fork end 94 of a tie rod 96 is attached by pivot pin 95 to the upper end of lever 88. Suspended from the beam 13 of the frame is a link 97 formed at its upper end with a part loosely linked onto an eye 98 secured to beam 13. This link 97 has formed at its lower end an eye 99 in which is mounted slidably the tie rod 96. In this way link 97 supports the tie rod in a horizontal position relatively to lever 88. Tie rod 96 is formed at its inner end with an eye 100 to which is loosely attached one end of a cable 101. Cable 101 has its opposite end attached to rock lever 40 forming part of the saw carriage swing frame. The cable 101 passes over so as to be trained around an idle small sheave 102 (Fig. 6), which sheave is mounted in a block 104 upon a shaft 103 secured to said block. It is seen that this cable 101 is confined in the block against displacement from sheave 102. A chain 106 has one end attached to the upper end of lever 88 and has another link thereof operatively attached to a clevis 107 mounted upon upright 14 of the framework.

The transmission shaft 68 carries, in the scaffold, a crank 108 which has an offset 109 upon which is pivotally mounted a forked pitman 110. Pitman 110 is pivotally mounted at its forked end (Fig. 3) to both rock levers 40 and 41 of the saw carriage by pins 111 to thereby hold the saw carriage steady.

The use and operation of this invention is as follows:

When it is desired automatically to cut a log into a number of sections and to convey the cut sections away, the motor (not shown) is started in order to rotate motor drive shaft 78. As motor drive shaft 78 rotates, it transmits power by belt 80 and pulley 81 to shaft 68. Belt 75 over pulley 76 on motor drive shaft 78, being trained over pulley 74 transmits motion to countershaft 73. As shaft 73 turns miter gear 85 thereon rotates miter gear 86, which rotates shaft 64, which sets in motion the belt 61 of the cut-log conveying away trough 26.

As motor drive shaft 78 rotates, pulley 82 thereon drives belt 83 which is trained over pulley 84 on shaft 43, which causes shaft 43 to rotate. Pulley 53 on shaft 43, by means of belt 51a drives pulley 50 on the saw shaft 51, which imparts rotation to cylindrical saw 52. As this is taking place, crank 108 connected to transmission shaft 68 is making a cycle of movement and causes pitman 110 to move lever arms 40, 41 together swivelably upon shaft 43 as a center of movement. Levers 40, 41 which form the swing frame, pendulum-like reciprocate the saw 52 causing it to make a log cutting traverse in one direction of movement and an idle traverse in a counter direction of movement. The idle movement of the saw 52 retracts it from position between troughs 26 and 34.

The log to be cut by saw 52 is placed on conveyer belt 54 so as to be snugly confined between side walls 35, 36 of the trough 34. Movement is imparted to this belt 54 intermittently only, step by step, toward the saw in a feeding direction. It is desired to move this belt only so far during each intermittent actuation thereof, just so far as will result in a certain section of uniform length of the log or strips or slabs, or any waste material from saw mill being cut off by rotation saw 52. This is accomplished as follows: The operator adjusts the length of the chain 106 (Fig. 1) between its point of attachment to clevis 107 and lever 88. Lever 88 is in reverse movement to the left, or in moving counterclockwise is limited by this chain 106 being pulled taut by this lever. The forward stroke imparted to this lever 88 is performed by tie rod 96, each time rock bar or lever 40 of the saw carriage swings upon shaft 43 in a direction effective to move saw 52 away from log sawing position where it is located between troughs 26 and 34. During this reverse motion of the levers 40, 41, cable 101 is pulled upon and drawn taut, and it in turn pulls upon tie rod 96 causing the latter to move towards the right of the framework. Movement of the tie rod 96 pulls the lever 88 forwardly, clockwise, which carries pawl 90 forwardly as well, held in positive engagement with ratchet wheel 91 by spring 93. Lever 88, in moving forwardly, tensions a spring 92. In moving forwardly pawl 90 moves and rotates the ratchet and pulley 55 to move the upper stretch of belt 54 in the direction of the saw, so that the log on this belt is moved forwardly beyond the discharge end of trough 34 a uniform distance, and in this projecting position of the log the rotating saw 52, during the cutting stroke imparted to it by lever arms 40, 41, severs the log. The cut section of the log falls by gravity upon belt 61, and is carried by cleats 62 thereof upwardly to an ultimate point of delivery.

The pitman 110 has a definite throw, which determines uniformly how far forwardly lever 88 will be moved by tie rod 96. However, the length of the log cut off is determined by how far back spring 92 can pull lever 88, which it relaxes. When chain 106 is drawn out taut, it stops reverse movement of lever 88. Hence the arcs over which pawl 90 will engage ratchet wheel 55 is determined by chain 106 according to the length of the latter. The longer the arc of ratchet wheel engaged by the pawl, the longer will be the section of log cut off.

The sides of the conveyor trough are formed with slots 36a (Fig. 1) within which the saw is adapted to loosely engage so that small wood pieces such as cut strips, slabs or other waste material from saw mills may be cut in addition to logs.

The saw 52 works in a slotted beam 52a (Figure 2) which extends rearwardly from the conveyor sides 36 so that the cut pieces will not be pulled rearwardly when the saw is swinging on its back stroke.

What I desire to claim is:

1. A wood saw of the kind described comprising a base frame, a scaffold on said frame, a log feeding conveyor belt adjacent said frame, a shaft on said scaffold, a swing frame rockably supported on said shaft, a rotatable saw on the lower end of said swing frame, operative connecting means between said saw and said first shaft for rotating said saw, a drive shaft carried by the frame, a crank on said drive shaft, a pitman between said crank and said swing frame for traversing said saw across said conveyor, said conveyor including a shaft at one end thereof, a ratchet on said shaft, a lever rockable on said conveyor shaft, a pawl rockable on said lever engaging said ratchet, and connecting means between said swing frame and the conveyor lever for effecting rocking of the conveyor shaft on retractive movement of the swing frame whereby said conveyor belt will be actuated in feeding direction upon swinging of said saw transversely away from the conveyor.

2. A wood saw of the kind described comprising a base frame, a scaffold on said frame, a log feeding conveyor belt adjacent said frame, a shaft on said scaffold, a swing frame rockably supported on said shaft, a rotatable saw on the lower end of said swing frame, operative connecting means between said saw and said first shaft for rotating said saw, a drive shaft journalled above the frame, a crank on said drive shaft, a pitman between said crank and said swing frame for traversing said saw across said conveyor, said conveyor including a shaft at one end thereof a ratchet on said shaft, a lever rockable on said conveyor shaft, a pawl rockable on said lever engaging said ratchet, and flexible connecting means between said swing frame and the conveyor lever for effecting rocking of the conveyor shaft on retractive movement of the swing frame whereby said conveyor belt will be actuated in feeding direction upon swinging of said saw transversely away from the conveyor.

3. A wood saw of the kind described comprising a base frame, a scaffold on said frame, a log feeding conveyor or belt adjacent said frame, a swing frame on said scaffold, a lever rockably supported on said shaft, a rotatable saw on the lower end of said swing frame, operative connecting means between said saw and said first shaft for rotating said saw, a drive shaft rotatably carried by the frame, a crank on said drive shaft, a pitman between said crank and said swing frame for traversing said saw across said conveyor, said conveyor including a shaft at one end thereof, a ratchet on said shaft, a lever rockable on said conveyor shaft, a pawl rockable on said lever engaging said ratchet, and flexible connecting means between said swing frame and the conveyor lever for effecting rocking whereby said conveyor belt will be actuated in feeding direction upon swinging of said saw transversely away from the conveyor, and spring means biasing said pawl bearing lever in a direction opposite from the direction effected by said rocking connection.

4. A wood saw of the kind described comprising a base frame, a scaffold on said frame, a log feeding conveyor belt adjacent said frame, a shaft on said scaffold, a swing frame rockably supported on said shaft, a rotatable saw on the lower end of said lever, operative connecting means between said saw and said first shaft for rotating said saw, a drive shaft journalled above the frame, a crank on said drive shaft, a pitman between said crank and said swing frame for traversing said saw across said conveyor, said conveyor including a shaft at one end thereof, a ratchet on said shaft, a lever rockable on said conveyor shaft, a pawl rockable on said lever engaging said ratchet, and flexible connecting means between said swing frame and the conveyor lever for effecting rocking of the conveyor shaft lever on the retractive movement of the swing frame whereby said conveyor belt will be actuated in a wood feeding direction upon swinging of said saw in transversely away from the conveyor, spring means biasing said pawl bearing lever in a direction opposite from the direction effected by said rocking connection, and means limiting the rocking of said latter lever by said spring means.

GEORGE WASHINGTON CASHWELL.

REFERENCES CITED

The following references are of record in the file of this patent:

UNITED STATES PATENTS

| Number | Name | Date |
|---|---|---|
| 293,037 | Kautz | Feb. 5, 1884 |
| 764,717 | Foshee | July 12, 1904 |
| 825,518 | Cox | July 10, 1906 |
| 1,262,943 | Gustafson | Apr. 16, 1918 |
| 1,625,026 | Holmes | Apr. 19, 1927 |
| 1,784,709 | Rich | Dec. 9, 1930 |
| 1,856,169 | Rosener et al. | May 3, 1932 |
| 2,039,017 | McLeod | Apr. 28, 1936 |
| 2,410,887 | Locke | Nov. 12, 1946 |